(12) United States Patent
Tsegelsky (10) Patent No.: US 8,034,159 B2
(45) Date of Patent: Oct. 11, 2011

(54) METHOD FOR REMOVING HYDROCARBONS FROM A VAPOUR-GAS MIXTURE AND A DEVICE FOR CARRYING OUT SAID METHOD

(76) Inventor: Valery Grigorievich Tsegelsky, Moscow (RU)

( * ) Notice: Subject to any disclaimer, the term of this patent is extended or adjusted under 35 U.S.C. 154(b) by 666 days.

(21) Appl. No.: 12/095,912

(22) PCT Filed: Jul. 24, 2006

(86) PCT No.: PCT/RU2006/000396
§ 371 (c)(1),
(2), (4) Date: Jun. 2, 2008

(87) PCT Pub. No.: WO2007/075116
PCT Pub. Date: Jul. 5, 2007

(65) Prior Publication Data
US 2008/0282881 A1 Nov. 20, 2008

(30) Foreign Application Priority Data

Dec. 29, 2005 (RU) .................................. 2005141232

(51) Int. Cl.
*B01D 53/00* (2006.01)
(52) U.S. Cl. ........................ 95/42; 95/39; 95/41; 96/243
(58) Field of Classification Search ................ 95/39, 42, 95/41; 96/243
See application file for complete search history.

(56) References Cited

U.S. PATENT DOCUMENTS

| | | | | |
|---|---|---|---|---|
| 3,167,929 A | * | 2/1965 | Rorschach | 62/101 |
| 3,947,258 A | * | 3/1976 | Decker | 95/229 |
| 4,409,102 A | * | 10/1983 | Tanner | 210/603 |
| 5,741,350 A | * | 4/1998 | Rowles et al. | 95/42 |
| 5,830,260 A | * | 11/1998 | Yueksel et al. | 95/42 |

FOREIGN PATENT DOCUMENTS

| | | |
|---|---|---|
| RU | 2073123 C1 | 2/1997 |
| RU | 2101577 C1 | 1/1998 |
| RU | 2193443 | 11/2002 |
| RU | 2261140 C1 | 9/2005 |

* cited by examiner

*Primary Examiner* — Jason M Greene
*Assistant Examiner* — Anthony Shumate
(74) *Attorney, Agent, or Firm* — Volpe and Koenig, P.C.

(57) ABSTRACT

A method for cleaning hydrocarbons from a gas-vapor medium ejected to the atmosphere, formed while storing oil or gasoline or filling a container therewith is provided. The medium is pumped out and compressed in a gas-liquid jet apparatus due to energy of oil or gasoline supplied by a pump. The formed mixture is separated in a separator, where a pressure of 0.7 to 2.5 MPa is maintained, and gas from the separator is compressed in a jet apparatus by oil or gasoline supplied by a pump. The gas medium cleaned from the hydrocarbons is outputted and the saturated absorbent is directed to a desorber where a pressure is generated to be lower than the pressure in the separator. The liquid medium is removed from the separators and to a container or to a storage tank from which oil or gasoline is simultaneously supplied to pump inlets or to the separators.

21 Claims, 2 Drawing Sheets

FIG. 1

FIG. 2

METHOD FOR REMOVING HYDROCARBONS FROM A VAPOUR-GAS MIXTURE AND A DEVICE FOR CARRYING OUT SAID METHOD

FIELD OF INVENTION

The present invention relates the field of jet equipment and preferably to methods using pumping and ejecting plants in systems for cleaning hydrocarbons out of a gas-vapor medium ejected to the atmosphere, formed while storing oil or gasoline or filling a container therewith.

BACKGROUND

Known is a method for cleaning hydrocarbons out of a gas-vapor medium formed while storing oil or an oil product or filling a container therewith, the method comprising: supplying a liquid medium by a pump into a gas-liquid jet apparatus; pumping out a gas-vapor medium by said apparatus from an oil or oil product storage tank and compressing said medium in the gas-liquid jet apparatus due to energy of the liquid medium; supplying the gas-vapor medium/liquid medium mixture formed in the gas-liquid jet apparatus to a separator; separating said mixture into a gaseous phase and a liquid medium in the separator and venting the gaseous phase from the separator, said gaseous phase being directed from the separator to an absorption column where a hydrocarbon liquid is supplied to; carrying out the process of absorbing hydrocarbons from the liquid phase by the hydrocarbon liquid followed by separate removing the gaseous phase cleaned from hydrocarbons and the hydrocarbon liquid having the liquid phase hydrocarbon solved therein from the absorption column (see RF U.S. Pat. No. 2,193,443, IPC B65D 90/30, Nov. 27, 2002).

Known from the same Patent is a pumping and ejecting plant for cleaning hydrocarbons out of a gas-vapor medium formed while storing oil or an oil products or filling a container therewith, the plant comprising a pump, a gas-liquid jet apparatus, a separator having a gaseous phase outlet, and an absorption column, wherein the gas-liquid jet apparatus is coupled at a liquid medium inlet to an outlet of the pump and is coupled at a gas outlet to a source of said medium which is an oil or oil product container or storage tank, and the gas-liquid jet apparatus is coupled at a mixture outlet to the separator, the absorption column is coupled to the gaseous phase from the separator, an upper portion of the absorption column is coupled to a pipeline for removing the gaseous phase cleaned from hydrocarbons and to a pipeline for feeding the hydrocarbon liquid.

However, the present method does not allow a high degree of cleaning the gas-vapor fluid from hydrocarbons, is sufficiently complicated and energy-consumable. This is connected with that the process of desorption is carried out in a rectification column fed by a great quantity of heat which requires the bulky heat-exchange equipment for heating the hydrocarbon fluid and condensing the resulted vapors.

The method closest to the invention in the technical essence and the accomplished technical result is a method for cleaning hydrocarbons out of a gas-vapor medium formed while storing oil or gasoline or filling a container with oil or gasoline, the method comprising: supplying a liquid medium by a pump into a gas-liquid jet apparatus; pumping a gas-vapor medium by said apparatus from an oil- or gasoline-filled container or an oil or gasoline storage tank and compressing said medium in the gas-liquid jet apparatus due to energy of the liquid medium; supplying the gas-vapor medium/liquid medium mixture formed in the gas-liquid jet apparatus to a separator; separating said mixture into a gaseous phase and a liquid medium in the separator; removing the liquid medium from the separator into the oil- or gasoline-filled container or the oil or gasoline storage tank; supplying oil or gasoline to an inlet of the pump or to the separator (see RF U.S. Pat. No. 2,261,140, IPC B01D 53/14, Sep. 27, 2005).

Known from the same Patent is a plant for cleaning hydrocarbons out of a gas-vapor medium formed while storing oil or gasoline or filling a container with oil or gasoline, the plant comprising a pump, a gas-liquid jet apparatus, a separator, a second pump, a second gas-liquid jet apparatus, and a desorber, wherein the gas-liquid jet apparatus is coupled at a liquid medium inlet to an outlet of the pump, is coupled at a gas inlet to a gas-vapor medium source which is an oil- or gasoline-filled container or an oil or gasoline storage tank, the gas-liquid jet apparatus is coupled at a mixture outlet to the separator that has a gaseous phase outlet and a liquid medium outlet coupled to the oil or gasoline storage tank or the oil- or gasoline-filled container, an inlet of the pump or the separator is coupled to a pipeline for pumping oil or gasoline or to the oil or gasoline storage tank, a gas outlet of the desorber is coupled to a gas inlet to the gas-liquid jet apparatus.

The present method and plant for carrying out the same provide compression and condensation of hydrocarbon vapors of oil or gasoline and reduction of hydrocarbon vapors harmful for the surroundings and present in the gas-vapor medium ejected to the atmosphere. Use of oil or gasoline in a working fluid of the gas-liquid jet apparatus makes it possible to carry out the process of absorbing a portion of hydrocarbon with oil or gasoline from the compressible medium simultaneously with compressing the gas-vapor medium. However, there is the great energy consumption for the pump drive because the entire gas-vapor consumption is compressed to great pressures in a single gas-liquid jet apparatus. Further, the hydrocarbon fluid desorption process is carried out in two desorbers with use of the second pump and the second gas-liquid jet apparatus for this purpose which results in complication of the plant. The final cleaning of the gas-vapor medium is carried out in the absorber embodied as an absorption column which increases the material consumption of the plant.

SUMMARY

It is an object of the present invention to clean hydrocarbons out of a gas-vapor medium formed while storing oil or gasoline or filling a container therewith.

The technical result to be accomplished by the invention is reduction of oil or gasoline losses, decrease of energy consumption, material consumption and plant sizes as well as increase of the efficiency of cleaning hydrocarbons out of a gas-vapor medium ejected to the atmosphere and formed while storing oil or gasoline or filling a container with oil or gasoline.

Said object is achieved and the technical result in part of a method as a subject-matter of the invention is accomplished by that a method for cleaning hydrocarbons out of a gas-vapor medium formed while storing oil or gasoline or filling a container with oil or gasoline comprises: supplying a liquid medium by a pump into a gas-liquid jet apparatus; pumping out a gas-vapor medium by said apparatus from an oil- or gasoline-filled container or an oil or gasoline storage tank and compressing said medium in the gas-liquid jet apparatus due to energy of the liquid medium; supplying the gas-vapor medium and liquid medium mixture formed in the gas-liquid jet apparatus to a separator; separating said mixture into a gaseous phase and a liquid medium in the separator; removing the liquid medium from the separator into the oil- or gasoline-filled container or the oil or gasoline storage tank; supplying oil or gasoline to an inlet of the pump or to the separator, wherein there are the steps of: supplying the gaseous phase from the separator to a second gas-liquid jet apparatus while supplying the liquid medium thereto by a second pump and compressing the gaseous phase due to energy of the liquid medium; supplying the gaseous phase and liquid medium mixture formed in the second gas-liquid jet apparatus to a second separator where said mixture is separated into a gas phase and a liquid medium; removing the liquid medium from the second separator to the oil- or gasoline-filled container or the oil or gasoline storage tank and simultaneously supplying oil or gasoline to an inlet of the second pump or to the second separator; supplying the gas medium from the second separator to a third gas-liquid jet apparatus where an absorbent is supplied to as the liquid medium and the process of absorbing hydrocarbons out of the gas medium by the absorbent is carried out; supplying the gas medium and absorbent mixture formed in the third gas-liquid jet apparatus to a third separator where a pressure is maintained within a range of from 0.7 MPa to 2.5 MPa and said mixture is separated into a gas medium removed from said separator and a gas medium hydrocarbon-saturated absorbent directed to a desorber; generating a pressure in the desorber to be lower that the pressure in the third separator; and extracting gas medium hydrocarbons contained in the absorbent out of said absorbent, followed by supplying said absorbent from the desorber to an inlet of the third pump.

Preferably, the pressure in the desorber is generated to be lower than the pressure in the third separator by pumping out gas medium hydrocarbons accumulated in said separator by the gas-liquid jet apparatus.

Preferably, the pressure in the desorber is generated to be lower than the pressure in the third separator by pumping out the gas medium hydrocarbons accumulated in said separator by a fourth gas-liquid jet apparatus coupled at a liquid medium inlet to the pump and coupled at an outlet for the mixture formed therein to the separator.

The absorbent is supplied to the third gas-liquid jet apparatus at a temperature within a range of from minus 30° C. to plus 45° C.

Preferably, a hydrocarbon liquid is used as the absorbent.

The hydrocarbon liquid preferably comprises not less than 50 mass. % of diesel fractions having boil-off limits of from 180° C. to 340° C.

The hydrocarbon liquid can be degassed oil.

It is possible to provide supplying a portion of the gas medium hydrocarbon-saturated absorbent from the third separator to the inlet of the third pump.

It is possible to provide supplying oil or gasoline to a separator or an inlet of a pump from the oil or gasoline storage tank or the pipeline for pumping thereof, wherein a flow rate is preferably not less than 25% of a flow rate of the liquid medium pumped through the pump.

It is possible to provide supplying oil or gasoline to the second separator or the inlet of the second pump from the oil or gasoline storage tank or the pipeline for pumping thereof, wherein a flow rate is preferably not less than 25% of a flow rate of the liquid medium pumped through the second pump.

It is possible to provide heating-up the absorbent saturated with the gas medium hydrocarbons after it leaves the third separator.

It is possible to provide preliminary degassing the gas medium hydrocarbon-saturated absorbent in a predesorber before said absorbent arrives at the desorber, a pressure in the predesorber being lower than that in the third separator and being generated by pumping gaseous hydrocarbons evolved in the predesorber out of said predesorber, while there is the step of vacuuming the desorber by pumping gaseous hydrocarbons evolved therein by the fourth gas-liquid jet apparatus coupled at a liquid medium inlet to the pump and coupled by an outlet for the medium formed therein to the separator.

Said object is achieved and the technical result in part of a device as a subject-matter of the invention is accomplished by that a plant for cleaning hydrocarbons out of a gas-vapor medium formed while storing oil or gasoline or filling a container with oil or gasoline, the plant comprising a pump, a gas-liquid jet apparatus, a separator, a second pump, a second gas-liquid jet apparatus, a third pump and a desorber, wherein the gas-liquid jet apparatus is coupled at a liquid medium inlet to an outlet of the pump, is coupled at a gas inlet to a gas-vapor medium source which is an oil- or gasoline-filled container or an oil or gasoline storage tank, the gas-liquid jet apparatus is coupled at a mixture outlet to the separator that has a gaseous phase outlet and a liquid medium outlet coupled to the oil or gasoline storage tank or the oil- or gasoline-filled container, an inlet of the pump or the separator is coupled to a pipeline for pumping oil or gasoline or to the oil or gasoline storage tank, a gas outlet of the desorber is coupled to a gas inlet to the gas-liquid jet apparatus, and the plant is further provided with a third gas-liquid jet apparatus, second and third separators, wherein the second gas-liquid jet apparatus is coupled at a liquid medium inlet to an outlet of the second pump and is coupled at a gas inlet to a gaseous phase outlet of the separator, wherein the second gas-liquid jet apparatus is coupled at a mixture outlet to the second separator which has a gas medium outlet and a liquid medium outlet coupled to the oil or gasoline storage tank or the oil- or gasoline-filled container, an inlet of the second pump or the second separator is coupled to the pipeline for pumping oil or gasoline or to the oil or gasoline storage tank, the third gas-liquid jet apparatus is coupled at a liquid medium inlet to an outlet of the third pump, is coupled at a gas inlet to the gas medium outlet of the second separator, and is coupled at a mixture outlet to the third separator provided with a gas medium outlet and a liquid medium outlet coupled to an inlet to the desorber while a liquid outlet of the desorber is coupled to an inlet to the third pump.

The plant can be provided with a heat exchanger mounted between the liquid medium outlet of the third separator and the liquid medium inlet to the desorber.

The plant can be provided with a heat exchanger mounted between the liquid medium outlet of the desorber and the liquid medium inlet to the third gas-liquid jet apparatus.

According to the second embodiment, a plant for cleaning hydrocarbons out of a gas-vapor medium formed while storing oil or gasoline or filling a container with oil or gasoline, the plant comprising a pump, a gas-liquid jet apparatus, a separator, a second pump, a second gas-liquid jet apparatus, a third pump, a fourth gas-liquid jet apparatus and a desorber, wherein the gas-liquid jet apparatus is coupled at a liquid medium inlet to an outlet of the pump, is coupled at a gas inlet to a gas-vapor medium source which is an oil- or gasoline-filled container or an oil or gasoline storage tank, the gas-liquid jet apparatus is coupled at a mixture outlet to the separator that has a gaseous phase outlet and a liquid medium outlet coupled to the oil or gasoline storage tank or the oil- or gasoline-filled container, an inlet of the pump or the separator is coupled to a pipeline for pumping oil or gasoline or to the oil or gasoline storage tank, a gas outlet of the desorber is coupled to a gas inlet to the fourth gas-liquid jet apparatus that is coupled at a liquid medium inlet to the outlet of the pump and is coupled by a mixture outlet to the separator, and the plant is further provided with a third gas-liquid jet apparatus, second and third separators, wherein the second gas-liquid jet apparatus is coupled at a liquid medium inlet to an outlet of the second pump and is coupled at a gas inlet to a gaseous phase outlet of the separator, wherein the second gas-liquid jet apparatus is coupled at a mixture outlet to the second separator which has a gas medium outlet and a liquid medium outlet coupled to the oil or gasoline storage tank or the oil- or gasoline-filled container, an inlet of the second pump or the second separator is coupled to the pipeline for pumping oil or gasoline or to the oil or gasoline storage tank, the third gas-liquid jet apparatus is coupled at a liquid medium inlet to an outlet of the third pump, is coupled at a gas inlet to the gas medium outlet of the second separator, and is coupled at a mixture outlet to the third separator provided with a gas medium outlet and a liquid medium outlet coupled to an inlet to the desorber while a liquid outlet of the desorber is coupled to an inlet to the third pump.

The plant can be provided with a heat exchanger mounted between the liquid medium outlet of the third separator and the liquid medium inlet to the desorber.

The plant can be provided with a heat exchanger mounted between the liquid medium outlet of the desorber and the liquid medium inlet to the third gas-liquid jet apparatus.

According to the third embodiment, a plant for cleaning hydrocarbons out of a gas-vapor medium formed while storing oil or gasoline or filling a container with oil or gasoline, the plant comprising a pump, a gas-liquid jet apparatus, a separator, a second pump, a second gas-liquid jet apparatus, a third pump, a fourth gas-liquid jet apparatus and a desorber, wherein the gas-liquid jet apparatus is coupled at a liquid medium inlet to an outlet of the pump, is coupled at a gas inlet to a gas-vapor medium source which is an oil- or gasoline-filled container or an oil or gasoline storage tank, the gas-liquid jet apparatus is coupled at a mixture outlet to the separator that has a gaseous phase outlet and a liquid medium outlet coupled to the oil or gasoline storage tank or the oil- or gasoline-filled container, an inlet of the pump or the separator is coupled to a pipeline for pumping oil or gasoline or to the oil or gasoline storage tank, a gas outlet of the desorber is coupled to a gas inlet to the fourth gas-liquid jet apparatus that is coupled at a liquid medium inlet to the outlet of the pump and is coupled by a mixture outlet to the separator, and the plant is further provided with a third gas-liquid jet apparatus, second and third separators and a predesorber, wherein the second gas-liquid jet apparatus is coupled at a liquid medium inlet to an outlet of the second pump and is coupled at a gas inlet to a gaseous phase outlet of the separator, wherein the second gas-liquid jet apparatus is coupled at a mixture outlet to the second separator which has a gas medium outlet and a liquid medium outlet coupled to the oil or gasoline storage tank or the oil- or gasoline-filled container, an inlet of the second pump or the second separator is coupled to the pipeline for pumping oil or gasoline or to the oil or gasoline storage tank, the third gas-liquid jet apparatus is coupled at a liquid medium inlet to an outlet of the third pump, is coupled at a gas inlet to the gas medium outlet of the second separator, and is coupled at a mixture outlet to the third separator provided with a gas medium outlet and a liquid medium outlet coupled to an inlet to the predesorber that has a gaseous hydrocarbons outlet coupled to a gas inlet to the gas-liquid jet apparatus, and with a partially degassed absorbent outlet coupled to a partially degassed absorbent inlet to the desorber while a liquid (absorbent) outlet of the desorber is coupled to an inlet to the third pump.

The plant can be provided with a heat exchanger mounted between the liquid medium outlet of the third separator and the liquid medium inlet to the predesorber.

The plant can be provided with a heat exchanger mounted between the liquid medium outlet of the desorber and the liquid medium inlet to the third gas-liquid jet apparatus.

The gas-vapor medium formed in oil or gasoline storage tanks as well as in operations of filling/emptying containers of different types consists generally of hydrocarbon vapors and air of nitrogen, if it is supplied to a storage tank. Hydrocarbon contents in the gas-vapor medium passing to the atmosphere results both in pollution of the surroundings and loss of a marketable product which is light fractions of oil or gasoline in the present case Therefore, cleaning hydrocarbons out of the gas-vapor medium is an actual task. It is necessary to prevent passage of hydrocarbons to the atmosphere and to reduce losses of marketable oil and gasoline.

The disclosed method and plants for carrying out the same allows reduction of a concentration of hydrocarbons in the gas-vapor medium down to a concentration lower than a level of maximum permissible blowouts of said vapors to the surroundings by compressing the gas-vapor medium and cleaning hydrocarbons out of said medium in three sequentially mounted pumping and ejecting plants each comprising a pump, a gas-liquid jet apparatus, and a separator. At the same time, to manage the absorption and compression processes, the final pumping and ejecting plant uses an absorbent different from the absorbent used in the first two pumping and ejecting plants.

From the viewpoint of simplifying the implementation of the method and plant for cleaning hydrocarbons out of a gas-vapor medium, it is the most expedient to use oil or gasoline in the first two pumping and ejecting plants, depending upon a particular liquid which is stored in a storage tank or fills a container as a source liquid used to fill separators prior to start the operation and used further for refreshment of the liquid medium supplied by pumps to the gas-liquid jet apparatuses of said two plants. In this case, the liquid medium absorbs a portion of hydrocarbons from the compressible gas-vapor medium and thereby partially cleans the hydrocarbons out of said medium. To refresh the liquid medium circulating in the plant, it is possible to supply oil or gasoline to separators or inlets of pumps of the first two pumping and ejecting plants.

To provide a high efficiency of cleaning the surroundings-harmful hydrocarbons out of the pumped-out gas-vapor medium, it is expedient to use an absorbent different from oil or gasoline as the liquid medium in the third pumping and ejecting plant. It is expedient to use a hydrocarbon liquid as such absorbent, for example, diesel or gas oil fractions or a kerosene fraction and diesel fraction mixture. It is also possible to use degassed oil. To this end, an absorption and desorption circuit for circulating absorbent is managed in the third pumping and ejecting plant.

It is necessary to bear in mind that liquid media (the hydrocarbon liquid, oil or gasoline) filling the plant prior to exploitation thereof are in question. In progress of operation, said liquid media are used only for replenishment of the absorption and desorption circuit and for refreshment of the liquid medium arriving at the gas-liquid jet apparatuses of the first two pumping and ejecting plants. As to a composition of the liquid medium which is supplied by pumps to the gas-liquid jet apparatuses or presents in the separators and desorber(s) (depending upon an embodiment of the plant) in progress of operating the plant, then, apart from the source liquid medium, the plant comprises a quantity of hydrocarbons passed thereto from the pumped-out gas-vapor medium.

Therefore, we can speak only of that the liquid medium in the separators of the first two pumping and ejecting plants is close in the composition to the source oil or gasoline while the hydrocarbon liquid (the absorbent) in the third pumping and ejecting plant and the desorbers is close in the composition to diesel, gas oil, kerosene fractions or a kerosene fraction and diesel fraction mixture, depending upon a particular medium used in progress of operating the plant.

It was established during the study that the most attractive from the economic viewpoint is the three-stage absorption of hydrocarbons from the gas-vapor medium pumped out by the gas-liquid jet apparatuses. At the first stage, absorption of hydrocarbons is managed in the gas-liquid jet apparatus where it is reasonable to compress the gas-vapor medium to a separator pressure being within the range of from 0.15 MPa to 0.4 MPa. At the same time, as noted above, oil or gasoline is used as a source liquid medium for pumping out and original absorbing hydrocarbons out of the gas-vapor medium to fill the separator with one of said media prior to operation of the plant. In progress of operation of the plant, oil or gasoline is used to refresh the liquid medium by supplying one of said liquid media, for example, to the inlet of the pump. Thus, conditions for starting the process for liquid medium absorption of hydrocarbons out of the gas-vapor medium. Therefore, the hydrocarbon content in the gaseous phase separated in the separator from the liquid medium is less than in the gas-vapor medium.

The second stage of the hydrocarbon absorption is managed in the second gas-liquid jet apparatus where the gas-vapor medium is compressed to a second separator pressure being within the range of from 0.5 MPa to 2.0 MPa. At the same time, as noted above, oil or gasoline is also used as a source liquid medium for pumping out and original absorbing hydrocarbons out of the gas-vapor medium, depending upon a liquid medium filling the second separator at the beginning of operation. In progress of operation of the plant, oil or gasoline is used to refresh the liquid medium as well by supplying it, for example, to the inlet of the second pump.

The third stage of the hydrocarbon absorption is managed in the third gas-liquid jet apparatus where the gas-vapor medium is compressed to a second separator pressure being within the range of from 0.7 MPa to 2.5 MPa. At the same time, as noted above, an absorbent different from that used as a source liquid medium in the first two gas-liquid jet apparatuses is used for pumping out the gas medium and absorbing hydrocarbons out of said medium. The absorbent is removed to the desorber for regeneration when absorption of hydrocarbons out of the gaseous hydrocarbon-saturated medium is over in the third separator.

It was found during studies that the efficiency of cleaning hydrocarbons out of the gas-vapor medium, as required by ecological standards, is achieved in compressing the gas medium out which hydrocarbons are cleaned to a third separator pressure being within the range of from 0.7 MPa to 2.5 MPa, depending upon a composition of the gas-vapor medium formed in load of oil or gasoline, compositions of liquid media used as an absorbent of hydrocarbons, and their temperatures and flow rates.

It was also found that compression of the gas-vapor medium to a pressure of 0.5 to 2.0 MPa using oil or gasoline for the gas-liquid jet apparatus in two stages is more advantageous economically that compression in one stage. This is because of the need to compress the entire gas-vapor medium flow to a separator pressure of 0.5 to 2.0 MPa. A portion of hydrocarbons is absorbed by the liquid medium of the gas-liquid jet apparatus already at the first stage in two-stage compression, therefore, the smaller gaseous phase flow arrives at the second compression stage, therefore, power consumable for compression becomes smaller. Further, a higher efficiency factor (EF) of gas-liquid jet apparatuses as compared to EF of a single gas-liquid jet apparatus is achieved at the two-stage compression as compared to the one-stage compression of the gas-vapor medium. At the same time, a minimum power consumed for compressing the gas-vapor medium is achieved at a first separator pressure being within the range of from 0.15 MPa to 0.4 MPa.

The third stage of absorbing hydrocarbons takes place in the third pumping and ejecting plant where hydrocarbons residuary in the gas medium are extracted out. However, to manage the effective process of absorbing hydrocarbons out of the gas medium, it is necessary to create conditions under which a liquid medium used as an absorbent were had a saturated vapor pressure at a temperature of supplying said medium to the third gas-liquid jet apparatus less than a saturated hydrocarbon vapor pressure in the gas-vapor medium formed while storing and load of oil or gasoline. Thus, correct selection of an absorbent is necessary as well as subsequent regeneration thereof after the absorption process in order to make it able to absorb hydrocarbons out of the gas medium again. Gas medium hydrocarbons accumulated in the absorbent are continuously extracted from the saturated absorbent and returned back to oil or gasoline using the gas-liquid jet apparatus in operation of the plant. To this end, systems for one- or two-stage desorption of the absorbent saturated by the gas medium hydrocarbons are used, with sequential reduction of the pressure in the desorbers as compared to the third separator pressure. The scheme of the invention provides matching the operation of the gas-liquid jet apparatuses and desorbers in pressures, and returning hydrocarbons extracted out of the gas-vapor medium formed in load and storage in the storage tank to the storage tank or the oil- or gasoline-filled container. With this, three embodiments of the plant are possible.

When requirements to the efficiency of cleaning hydrocarbons out of the gas-vapor medium are relatively low, it is possible to use the plant with one desorber from which the gaseous hydrocarbons are pumped out by the gas-liquid jet apparatus. When pressure fluctuation in the gas-vapor medium at the inlet to the gas-liquid jet apparatus is large, it is reasonable to use the plant wherein the fourth gas-liquid jet apparatus pumps hydrocarbons out of the desorber, which allows maintenance of a stable pressure in the desorber. To provide a higher efficiency of cleaning hydrocarbons out of the gas-vapor medium, it is reasonable to use the plant with the predesorber wherein the absorbent saturated with the gas-vapor medium hydrocarbons is preliminary regenerated at a pressure close to the pressure of the gas-vapor medium pumped out by the gas-liquid jet apparatus. To provide more complete extraction of the gas-vapor medium hydrocarbons solved in the saturated absorbent out of said absorbent, the fourth gas-liquid jet apparatus vacuums the desorber in this case. This provides the supply of the absorbent with a higher degree of regeneration, which increases the efficiency of cleaning hydrocarbons out of the gas-vapor medium.

It is possible to improve the process or regenerating the absorbent in the desorber by heating-up the absorbent after it gets out of the separator.

It was found during the study that use of a hydrocarbon liquid as the absorbent is reasonable. It would be reasonable to use a liquid comprising not less than 50 mass. % of diesel fractions having boil-off limits of from 180° C. to 340° C., or a degassed oil, as the hydrocarbon liquid. It would be reasonable to supply the absorbent to the third gas-liquid jet apparatus at a temperature being within the range of from minus 30° C. to plus 40° C. This increases the efficiency of cleaning hydrocarbons out of the gas-vapor medium.

It is possible to supply the liquid medium from the separator to the inlet of the pump and from the second separator to the inlet of the second pump, which allows management of two identical circulation circuits for said medium as follows: the separator—the pump—the gas-liquid jet apparatus—the separator. This provides reduction in consumption of fresh oil or gasoline supplied to the plant from the storage tank for storage thereof or from the pipeline for pumping thereof. Since carbons transit from the pumped-out gas-vapor medium into the liquid medium supplied by pumps to the gas-liquid jet apparatuses in progress of operation, then, it is necessary to refresh the liquid medium by removal thereof from the plant, for example, to the oil or gasoline storage tank or the oil- or gasoline-filled container, and to feed a fresh (source) liquid medium—oil or gasoline—to the plant.

Removal of the liquid medium from its circulation circuits and feed of a fresh liquid medium—oil or gasoline—to each circuit at a flow rate not less than 25% of a flow rate of the liquid medium pumped through the pump of this circuit makes it possible to stabilize a composition of the liquid medium supplied to inlets of the gas-liquid jet apparatuses, and to provide the process of liquid medium absorption of hydrocarbons from the pumped-out liquid gas-vapor medium. It is possible to transfer a portion of the saturated absorbent from the third separator to the inlet of the third pump, which decreased power consumed by said pump. In this case, the regenerated absorbent is supplied from the desorber to the inlet of the third pump by a boost pump. If necessary, it is possible to feed a fresh absorbent (the hydrocarbon liquid) to the desorber when the quantity of said absorbent reduces in progress of exploitation or as a result of carryover or leakages.

As a result, effective operation of the entire plant was a success, and the high efficiency of cleaning hydrocarbons out of the gas-vapor medium removed to the atmosphere was provided.

DETAILED DESCRIPTION OF THE PREFERRED EMBODIMENTS

A first embodiment of a plant for cleaning hydrocarbons out of the gas-vapor medium formed while storing oil or gasoline or fill of a container with oil or gasoline (see FIG. 1) comprises a pump 1, a gas-liquid jet apparatus 2, a separator 3, a second pump 4, a second gas-liquid jet apparatus 5, a third pump 6 and a desorber 7. The gas-liquid jet apparatus 2 is coupled at a liquid medium inlet 8 to an outlet of the pump 1, is coupled at a gas inlet 9 to a gas-vapor medium source which is an oil- or gasoline-filled container 10 or an oil or gasoline storage tank 11. The gas-liquid jet apparatus is coupled at a mixture outlet 12 to the separator 3 that has a gaseous phase outlet 13 and a liquid medium outlet 14 coupled to the oil or gasoline storage tank 11 or the oil- or gasoline-filled container 10. An inlet of the pump 1 or the separator 3 is coupled to a pipeline 15 for pumping oil or gasoline or to the oil or gasoline storage tank 11. A gas outlet of the desorber 7 is coupled to a gas inlet 9 to the gas-liquid jet apparatus 2. The plant is provided with a third gas-liquid jet apparatus 16, second and third separators 17 and 18, wherein the second gas-liquid jet apparatus 5 is coupled at a liquid medium inlet 19 to an outlet of the second pump 4, is coupled at a gas inlet 20 to a gaseous phase outlet 13 of the separator 3, wherein the second gas-liquid jet apparatus 5 is coupled at a mixture outlet 21 to the second separator 17 which has a gas medium outlet 22 and a liquid medium outlet 23 coupled to the oil or gasoline storage tank 11 or the oil- or gasoline-filled container 10. An inlet of the second pump 4 or the second separator 17 is coupled to the pipeline 15 for pumping oil or gasoline or to the oil or gasoline storage tank 11. The third gas-liquid jet apparatus 16 is coupled at a liquid medium inlet 24 to an outlet of the third pump 6, is coupled at a gas inlet 25 to the gas medium outlet 22 of the second separator 17, and is coupled at a mixture outlet 26 to the third separator 18 provided with a gas medium outlet 27 and a liquid medium outlet 28 coupled to an inlet to the desorber 7 while a liquid outlet of the desorber 7 is coupled to an inlet to the third pump 6.

Figure 1:
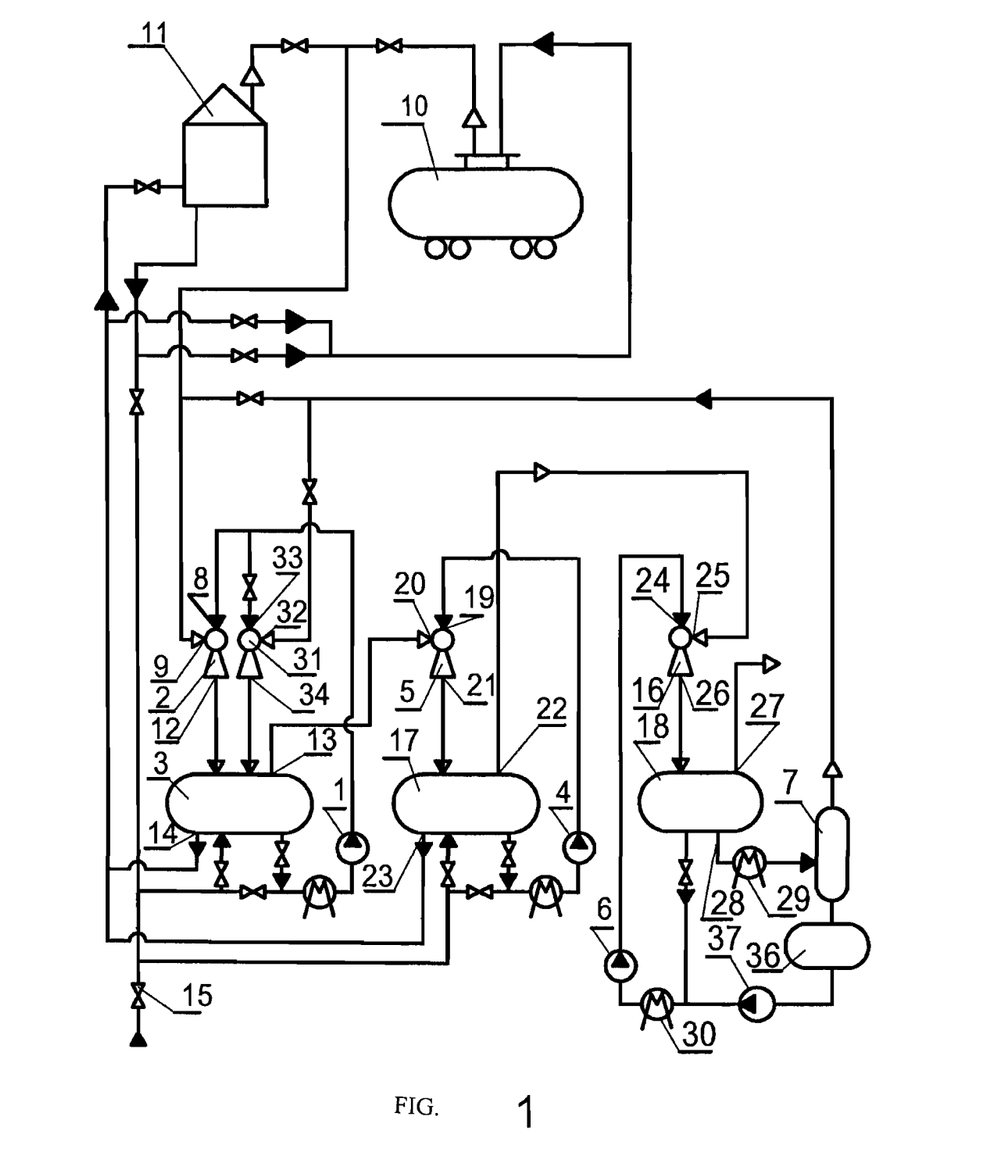
FIG. 1 shows a schematic diagram combining first and second embodiments of a plant wherein the inventive method is implemented for cleaning hydrocarbons out of the gas-vapor medium formed while storing oil or gasoline or fill of a container with oil or gasoline.

The plant can be provided with a heat exchanger 29 mounted between the liquid medium outlet 28 of the third separator 18 and the liquid medium inlet to the desorber 7.

The plant can be provided with a heat exchanger 30 mounted between the liquid medium outlet of the desorber 7 and the liquid medium inlet 24 to the third gas-liquid jet apparatus 16.

A second embodiment (see FIG. 1) of a plant for cleaning hydrocarbons out of the gas-vapor medium formed while storing oil or gasoline or fill of a container with oil or gasoline differs from the first embodiment thereof in that the plant comprises a fourth gas-liquid jet apparatus 31. At the same time, a gas outlet of the desorber 7 is coupled not to a gas inlet 9 to the gas-liquid jet apparatus 2 but to a gas inlet 32 to the fourth gas-liquid jet apparatus that is coupled at a liquid medium inlet 33 to an outlet of the pump 1 and is coupled at a mixture outlet 34 to the separator 3.

A third embodiment of a plant (see FIG. 2) differs from the second embodiment thereof in that the plant comprises a predesorber 35 that is coupled at a liquid medium inlet to the liquid medium outlet 28 of the third separator 18, is coupled by a partially degassed absorbent (hydrocarbon liquid) outlet to a partially degassed absorbent inlet to the desorber 7, and is coupled at a gaseous hydrocarbons outlet to the gas inlet 9 to the gas-liquid jet apparatus 2.

Figure 2:
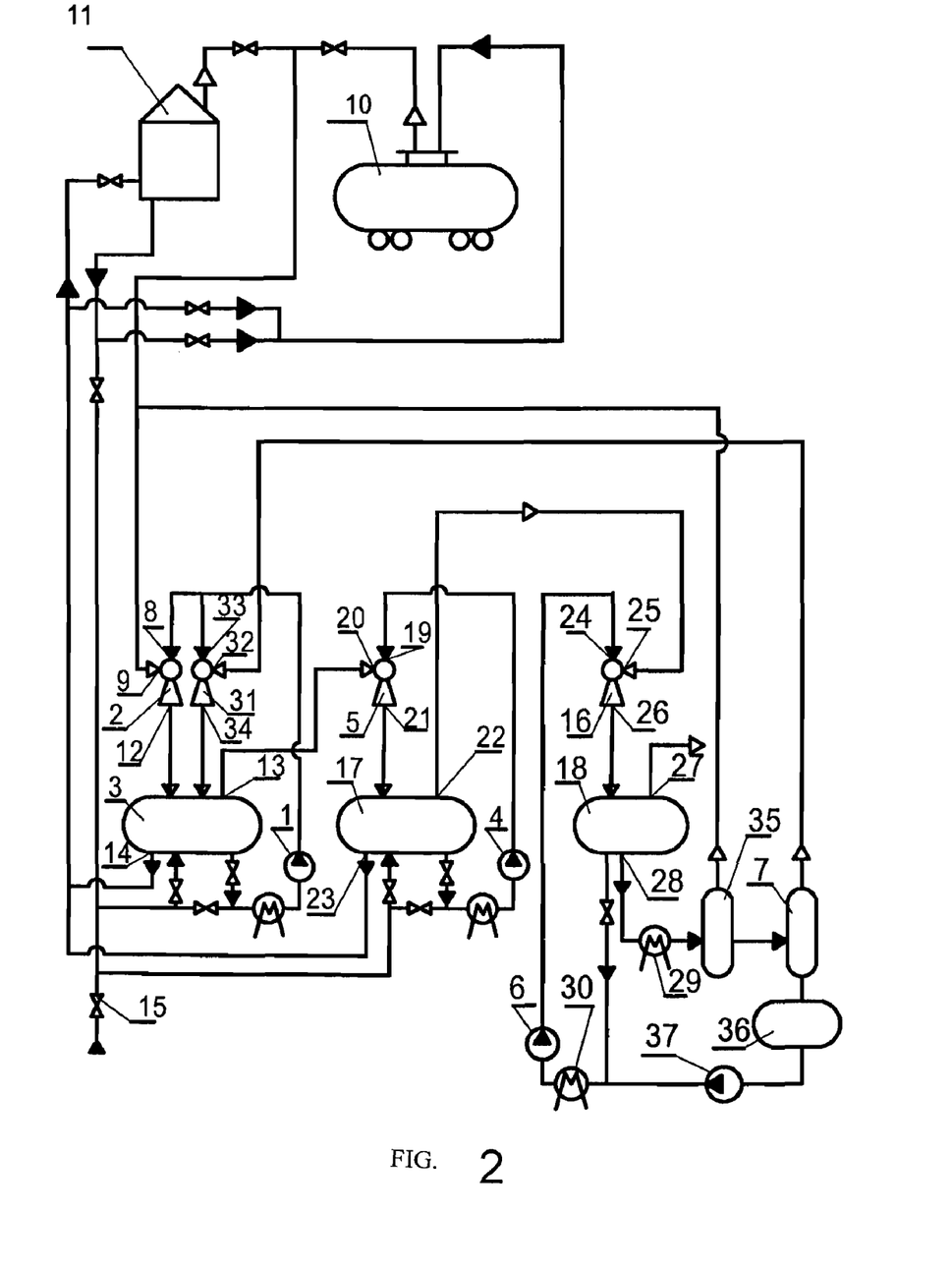
FIG. 2 shows a third embodiment of such a plant.

Let us consider operation of the plant for cleaning hydrocarbons out of the gas-vapor phase formed while storing oil or gasoline or in fill a container with oil or gasoline by the example when a gas-vapor medium source is oil that fills the container 10 and is stored in the storage tank 11. The separators 3, and 17 is filled with this oil prior to start operation of the plant, and the oil is supplied to said separators or to inlets of the pumps 1, 4 during operation of the plant. The third separator 18 included in the absorption and desorption circuit is preferably filled with the absorbent, preferably the hydrocarbon liquid, for example the diesel fraction, prior to start operation of the plant. The absorbent flows in the absorption and desorption circuit from the third pump 6 to the third gas-liquid jet apparatus 16 and further to the third separator 18 and goes from it through the desorber 7 back to the inlet of the third pump 6. With this, it is necessary to take into account that, as discussed above, gasoline can be used instead of oil and the gas-oil fraction, the kerosene fraction, the kerosene and diesel fraction mixture, the degassed oil, or other more effective absorbent, can be used instead of the diesel fraction.

A gas-vapor medium is formed in progress of oil storage and execution of operations of filling/emptying the storage tank 11 or in filling the container 10 with oil. To manage the process or cleaning hydrocarbons out of the gas-vapor medium, a liquid medium (which is oil in the initial state) is supplied by the pump 1 under pressure to a nozzle of the gas-liquid jet apparatus 2, and the latter pumps the gas-vapor medium from the oil-filled container 10 or the oil storage tank 11. The gas-vapor medium is compressed in the gas-liquid jet apparatus 2 due to energy of the liquid medium and is partially absorbed by liquid. In progress of absorption, a portion of hydrocarbons transforms from the gas-vapor medium to the liquid medium. The gas-vapor medium and liquid medium mixture formed in the gas-liquid jet apparatus 2 is supplied therefrom to the separator 3 where hydrocarbons continue transformation from the gas-vapor medium to the liquid medium. The pressure is maintained in the separator 3 within the range of from 0.15 MPa to 0.4 MPa, and the mixture arriving at this separator is separated into a gaseous phase and a liquid medium. The liquid medium from the separator 3 can be supplied to the inlet of the pump 1, which allows formation of a liquid medium circulation circuit. The liquid medium flows in said circulation circuit from the separator 3 to the pump 1 and further to the gas-liquid jet apparatus 2 and goes from the latter back to the separator 3. Oil is supplied to the separator 3 and/or the inlet of the pump 1 from the oil storage tank 11 or the oil pumping pipeline 15 preferably at a flow rate that is not less than 25% of a flow rate of the liquid medium pumped through the pump 1. The excess of the liquid medium is removed from the separator 3 to the oil storage tank 11 or the oil-filled container 10. Due to supply of "cold" oil (that is, oil which was not heated in progress of its circulation through the plant) from the storage tank 11 or the pipeline 15, there is stabilization of the liquid medium composition and temperature in the liquid medium circulation circuit.

The gaseous phase arrives from the separator 3 at the second gas-liquid jet apparatus 5 wherein said medium is compressed to a pressure being within the range of from 0.4 MPa to 2.0 MPa due to energy of the liquid medium supplied by the second pump 4. The gaseous phase and liquid medium mixture formed in the second gas-liquid jet apparatus 5 is supplied therefrom to the second separator 17 where said mixture is separated to a gas medium and a liquid medium. Hydrocarbons continue transformation from the gaseous phase to the liquid medium. The liquid medium from the second separator 17 can be supplied to the inlet of the second pump 4, which allows formation of a second liquid medium circulation circuit. Oil is supplied to the second separator 17 and/or the inlet of the second pump 4 from the oil storage tank 11 or the pipeline 15. The excess of the liquid medium is removed from the second separator 17 to the oil storage tank 11 or the oil-filled container 10. The liquid medium composition and temperature in the liquid medium circulation circuit are stabilized by supplying oil to the second separator 17 or the inlet of the second pump 4 from the pipeline 15 preferably at a flow rate that is not less than 25% of a flow rate of the liquid medium pumped through the second pump 4.

The gas medium arrives from the second separator 17 at the third gas-liquid jet apparatus 16 fed by an absorbent—a hydrocarbon liquid in the considered example—as the liquid medium by the pump 6. As a result of interaction of different phase flows mixed in the third gas-liquid jet apparatus 16, there is a process of absorbing hydrocarbons out of the gas medium by the absorbent (the hydrocarbon liquid), and compressing said medium to the pressure present in the third separator 18. The mixture formed in the third gas-liquid jet apparatus 16 arrives at the third separator 18 where a pressure is maintained within the range of from 0.7 MPa to 2.5 MPa. Absorption of hydrocarbons out of the gas medium continues in the mixture. The mixture is separated in the third separator 18 into a hydrocarbon-cleaned gas medium removed through the outlet 27 from the third separator and a gas mixture hydrocarbon-saturated absorbent supplied to regeneration through the outlet 28.

In accordance with the first embodiment of the plant (see FIG. 1), the saturated absorbent (in the considered example it is the hydrocarbon liquid with the gas medium hydrocarbon solved therein) is directed for regeneration to the desorber 7 where a pressure is maintained less than the pressure in the third separator 18, and the gas medium hydrocarbon solved in the arrived saturated absorbent are extracted therefrom and pumped out by the gas-liquid jet apparatus 2 together with the gas-vapor medium formed in load of oil. After regeneration, the absorbent is supplied from the desorber 7 by the third pump 6 to the third gas-liquid jet apparatus 16. To provide more complete extraction of the gas-vapor medium hydrocarbons out of said absorbent, the latter can be heated in the heat exchanger 29 prior to arrival at the desorber 7 or the predesorber 35. To this end, heat of the liquid medium that leaves the separator 3 of 17 can be used. It is possible to use heat of oil or other heat carrying agent having a higher temperature as compared to the temperature of the saturated absorbent. The absorbent can be preliminary supplied from the desorber 7 to an accumulating container 36. Further, a portion of the saturated absorbent can be supplied from the third separator 18 to the inlet of the third pump 6 using a boost pump 37. This provides the supply of the absorbent with a higher degree of regeneration, which increases the efficiency of cleaning hydrocarbons out of the gas-vapor medium. To take heat from the absorption and desorption circuit and to improve the efficiency of cleaning hydrocarbons out of the gas medium, the absorbent is cooled in the heat exchanger 30 preferably down to a temperature within the range of minus 30° C. to plus 45° C. after it leaves the desorber 7 and before it is supplied to the third gas-liquid jet apparatus 16. Coolant supplied to the heat exchanger 30 can be cooled, for example by a refrigerating machine.

Operation of the plant in accordance with the second embodiment thereof differs from the first embodiment only in that the gas medium hydrocarbon are solved from the desorber 7 not by the gas-liquid jet apparatus 2 but by the fourth gas-liquid jet apparatus 31 because of supplying the liquid medium by the pump 1 thereto. The compressed mixture formed in the fourth gas-liquid jet apparatus 31 and consisting of the liquid medium and gaseous hydrocarbons (gas medium hydrocarbons) extracted in the desorber 7 is supplied to the separator 3. The process of absorbing gaseous hydrocarbons by the liquid medium goes in this mixture.

Operation of the plant in accordance with the third embodiment thereof (see FIG. 2) differs from the second embodiment in that the saturated absorbent is preliminary degassed in the predesorber 35 before said absorbent arrives at the desorber 7, said degassing taking place at a pressure which is below than the pressure in the third separator 18 and is generated by pumping the gaseous hydrocarbons accumulated in the desorber 35 out of said desorber, wherein the desorber 7 is vacuumed and the gas medium hydrocarbons solved in the arrived absorbent are finally extracted therefrom when being pumped out by the fourth gas-liquid jet apparatus 31.

INDUSTRIAL APPLICABILITY

The present method of cleaning hydrocarbons out of the gas-vapor medium formed while storing oil or gasoline or filling container with oil or gasoline and the plants for implementing said method can be used at the oil or gasoline load trestles, the oil tank farms, the works of oil-refining industry and petrochemical industry, and in other industries.

The invention claimed is:

1. A method for cleaning hydrocarbons out of a gas-vapor medium formed while storing oil or gasoline in a storage tank or filling a container with oil or gasoline, the method including:
supplying a liquid medium by a pump into a gas-liquid jet apparatus;
pumping out a gas-vapor medium by the gas-liquid jet apparatus from a container filling with oil or gasoline or from an oil or gasoline storage tank and compressing the gas-vapor medium in the gas-liquid jet apparatus due to energy of the liquid medium supplying by the pump;
supplying the gas-vapor medium and liquid medium mixture formed in the gas-liquid jet apparatus to a separator;
separating the gas-vapor medium and liquid medium mixture into a gaseous phase and a liquid medium in the separator;
supplying the liquid medium from the separator into the container filling with oil or gasoline or into the oil or gasoline storage tank;
supplying oil or gasoline to an inlet of the pump or to the separator from the oil or gasoline storage tank or from a pipeline for pumping oil or gasoline;
supplying the gaseous phase from the separator into a second gas-liquid jet apparatus;
supplying the liquid medium by a second pump into the second gas-liquid jet apparatus and compressing the gaseous phase in the second gas-liquid jet apparatus due to energy of the liquid medium;
supplying the gaseous phase and liquid medium mixture formed in the second gas-liquid jet apparatus to a second separator;
separating the gaseous phase and liquid medium mixture into a gas medium and a liquid medium in the second separator;
supplying the liquid medium from the second separator into the container filling with oil or gasoline or into the oil or gasoline storage tank;
supplying oil or gasoline to an inlet of the second pump or to the second separator from the oil or gasoline storage tank or from the pipeline for pumping oil or gasoline;
supplying the gas medium from the second separator into a third gas-liquid jet apparatus;
supplying an absorbent by a third pump into the third gas-liquid jet apparatus and carrying out the process of absorbing hydrocarbons out of the gas medium by the absorbent;
supplying the gas medium and absorbent mixture formed in the third gas-liquid jet apparatus to a third separator;
maintaining a pressure in the third separator within a range of from 0.7 MPa to 2.5 MPa and separating the gas medium and absorbant mixture into a cleaned from hydrocarbons gas medium and a gas medium hydrocarbon-contained absorbent;
removing the cleaned from hydrocarbons gas medium from the third separator and supplying the gas medium hydrocarbon-contained absorbent from the third separator into a desorber;
generating a pressure in the desorber to be lower than the pressure in the third separator; and extracting gas medium hydrocarbons from the gas medium hydrocarbon contained absorbent supplied to the desorber;
supplying the absorbent from the desorber into an inlet of the third pump.

2. The method according to claim 1, wherein the pressure in the desorber is generated to be lower than the pressure in the third separator by pumping out gas medium hydrocarbons extracted in the desorber by the gas-liquid jet apparatus.

3. The method according to claim 1, wherein the pressure in the desorber is generated to be lower than the pressure in the third separator by pumping out gas medium hydrocarbons extracted in the desorber by a fourth gas-liquid jet apparatus coupled at a liquid medium inlet to the pump and coupled to the separator at an outlet of the mixture formed in the fourth gas-liqued jet apparatus.

4. The method according to claim 1, wherein the absorbent having a temperature within a range of from minus 30° C. to plus 45° C. is supplied to the third gas-liquid jet apparatus.

5. The method according to claim 1, wherein a hydrocarbon liquid is used as the absorbent.

6. The method according to claim 5, wherein the hydrocarbon liquid comprises not less than 50 mass % of diesel fractions having boil-off limits of from 180° C. to 340° C.

7. The method according to claim 5, wherein the hydrocarbon liquid is degassed oil.

8. The method according to claim 1, further comprising supplying a portion of the gas medium hydrocarbon-contained absorbent from the third separator into the inlet of the third pump.

9. The method according to claim 1, wherein a portion of the liquid medium is supplied from the separator into the inlet of the pump.

10. The method according to claim 1, wherein a portion of the liquid medium is supplied from the second separator into the inlet of the second pump.

11. The method according to claim 1, further comprising heating-up the gas medium hydrocarbon-contained absorbent after the absorbent leaves the third separator.

12. The method according to claim 1, wherein the gas medium hydrocarbon-contained absorbent is preliminary degassed in a predesorber before the gas medium hydrocarbon-contained absorbent arrives at the desorber, a pressure in the predesorber being generated lower than the pressure in the third separator by pumping out by the gas-liquid jet apparatus gaseous hydrocarbons evolved in the predesorber out of the predesorber;
vacuuming the desorber by pumping out gas medium hydrocarbons evolved in the desorber by a fourth gas-liquid jet apparatus coupled at a liquid medium inlet to the pump and coupled to the separator at an outlet of the mixture formed in the fourth gas-liquid jet apparatus.

13. A plant for cleaning hydrocarbons out of a gas-vapor medium formed while storing oil or gasoline in a storage tank or filling a container with oil or gasoline, the plant comprising a pump, a gas-liquid jet apparatus, a separator, a second pump, a second gas-liquid jet apparatus, a third pump, a third gas-liquid jet apparatus and a desorber,
wherein the gas-liquid jet apparatus is coupled at a liquid medium inlet to an outlet of the pump and is coupled at a gas inlet to a gas-vapor medium source which is a container filling with oil or gasoline or an oil or gasoline storage tank,
the gas-liquid jet apparatus is coupled at a mixture outlet to the separator that has a gaseous phase outlet and a liquid medium outlet, the liquid medium outlet being coupled to the oil or gasoline storage tank or to the container filling with oil or gasoline,
an inlet of the pump or the separator is coupled to a pipeline for pumping oil or gasoline or to the oil or gasoline storage tank, a gas outlet of the desorber is coupled to a gas inlet of the gas-liquid jet apparatus, the plant further comprising second and third separators, wherein the second gas-liquid jet apparatus is coupled at a liquid medium inlet to an outlet of the second pump and is coupled at a gas inlet to a gaseous phase outlet of the separator, the second gas-liquid jet apparatus is coupled at a mixture outlet to the second separator which has a gas medium outlet and a liquid medium outlet, the liquid medium outlet being coupled to the oil or gasoline storage tank or to the container filling with oil or gasoline, an inlet of the second pump or the second separator is coupled to the pipeline for pumping oil or gasoline or to the oil or gasoline storage tank, the third gas-liquid jet apparatus is coupled at a liquid medium inlet to an outlet of the third pump and is coupled at a gas inlet to the gas medium outlet of the second separator, the third gas-liquid jet apparatus is coupled at a mixture outlet to the third separator provided with a gas medium outlet and a liquid medium outlet coupled to an inlet of the desorber, a liquid outlet of the desorber is coupled to an inlet of the third pump.

14. The plant according to claim 13, wherein the liquid medium outlet of the separator is coupled additionally to the inlet of the pump and the liquid medium outlet of the second separator is coupled additionally to the inlet of the second pump.

15. The plant according to claim 13 further comprising a heat exchanger mounted between the liquid medium outlet of the desorber and the liquid medium inlet of the third gas-liquid jet apparatus.

16. A plant for cleaning hydrocarbons out of a gas-vapor medium formed while storing oil or gasoline in a storage tank or filling a container with oil or gasoline, the plant comprising a pump, a gas-liquid jet apparatus, a separator, a second pump, a second gas-liquid jet apparatus, a third pump, a fourth gas-liquid jet apparatus and a desorber, wherein the gas-liquid jet apparatus is coupled at a liquid medium inlet to an outlet of the pump and is coupled at a gas inlet to a gas-vapor medium source which is a container filling with oil or gasoline or an oil or gasoline storage tank, the gas-liquid jet apparatus is coupled at a mixture outlet to the separator that has a gaseous phase outlet and a liquid medium outlet, the liquid medium outlet being coupled to the oil or gasoline storage tank or to the container filling with oil or gasoline, an inlet of the pump or the separator is coupled to a pipeline for pumping oil or gasoline or to the oil or gasoline storage tank, a gas outlet of the desorber is coupled to a gas inlet to the fourth gas-liquid jet apparatus that is coupled at a liquid medium inlet to the outlet of the pump and is coupled by a mixture outlet to the separator, the plant further comprising a third gas-liquid jet apparatus, and second and third separators, wherein the second gas-liquid jet apparatus is coupled at a liquid medium inlet to an outlet of the second pump and is coupled at a gas inlet to a gaseous phase outlet of the separator, the second gas-liquid jet apparatus is coupled at a mixture outlet to the second separator which has a gas medium outlet and a liquid medium outlet, the liquid medium outlet being coupled to the oil or gasoline storage tank or to the container filling with oil or gasoline, an inlet of the second pump or the second separator is coupled to the pipeline for pumping oil or gasoline or to the oil or gasoline storage tank, the third gas-liquid jet apparatus is coupled at a liquid medium inlet to an outlet of the third pump and is coupled at a gas inlet to the gas medium outlet of the second separator, the third gas-liquid jet apparatus is coupled at a mixture outlet to the third separator provided with a gas medium outlet and a liquid medium outlet coupled to an inlet to the desorber, a liquid outlet of the desorber is coupled to an inlet to the third pump.

17. The plant according to claim 16, wherein the liquid medium outlet of the separator is coupled additionally to the inlet of the pump and the liquid medium outlet of the second separator is coupled additionally to the inlet of the second pump.

18. The plant according to claim 16 further comprising a heat exchanger mounted between the liquid outlet of the desorber and the liquid medium inlet to the third gas-liquid jet apparatus.

19. A plant for cleaning hydrocarbons out of a gas-vapor medium formed while storing oil or gasoline in a storage tank or filling a container with oil or gasoline, the plant comprising a pump, a gas-liquid jet apparatus, a separator, a second pump, a second gas-liquid jet apparatus, a third pump, a fourth gas-liquid jet apparatus and a desorber, wherein the gas-liquid jet apparatus is coupled at a liquid medium inlet to an outlet of the pump and is coupled at a gas inlet to a gas-vapor medium source which is a container filling with oil or gasoline or an oil or gasoline storage tank, the gas-liquid jet apparatus is coupled at a mixture outlet to the separator that has a gaseous phase outlet and a liquid medium outlet, the liquid medium outlet being coupled to the oil or gasoline storage tank or to the container filling with oil or gasoline, an inlet of the pump or the separator is coupled to a pipeline for pumping oil or gasoline or to the oil or gasoline storage tank, a gas outlet of the desorber is coupled to a gas inlet of the fourth gas-liquid jet apparatus that is coupled at a liquid medium inlet to the outlet of the pump and is coupled by a mixture outlet to the separator, said plant further comprising a third gas-liquid jet apparatus, second and third separators and a predesorber, wherein the second gas-liquid jet apparatus is coupled at a liquid medium inlet to an outlet of the second pump and is coupled at a gas inlet to a gaseous phase outlet of the separator, the second gas-liquid jet apparatus is coupled at a mixture outlet to the second separator which has a gas medium outlet and a liquid medium outlet, the liquid medium outlet being coupled to the oil or gasoline storage tank or the container filling with oil or gasoline, an inlet of the second pump or the second separator is coupled to the pipeline for pumping oil or gasoline or to the oil or gasoline storage tank, the third gas-liquid jet apparatus is coupled at a liquid medium inlet to an outlet of the third pump and is coupled at a gas inlet to the gas medium outlet of the second separator, the third gas-liquid jet apparatus is coupled at a mixture outlet to the third separator provided with a gas medium outlet and a liquid medium outlet coupled to an inlet to the predesorber, the predesorber is coupled at a gaseous hydrocarbons outlet to a gas inlet of the gas-liquid jet apparatus and is coupled at an absorbent outlet to an inlet of the desorber,
a liquid outlet of the desorber is coupled to an inlet to the third pump.

20. The plant according to claim 19, wherein the liquid medium outlet of the separator is coupled additionally to the inlet of the pump and the liquid medium outlet of the second separator is coupled additionally to the inlet of the second pump.

21. The plant according to claim 19, further comprising a heat exchanger mounted between the liquid outlet of the desorber and the liquid medium inlet of the third gas-liquid jet apparatus.

* * * * *